United States Patent
Wu (10) Patent No.: US 7,032,217 B2
(45) Date of Patent: Apr. 18, 2006

(54) METHOD AND SYSTEM FOR COLLABORATIVE PROFILING FOR CONTINUOUS DETECTION OF PROFILE PHASE TRANSITIONS

(75) Inventor: Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 421 days.

(21) Appl. No.: 09/818,688

(22) Filed: Mar. 26, 2001

(65) Prior Publication Data

US 2004/0015930 A1    Jan. 22, 2004

(51) Int. Cl.
  G06F 9/45    (2006.01)
(52) U.S. Cl. ................ 717/158; 717/127; 717/130; 717/131
(58) Field of Classification Search ........ 717/124–135, 717/151–161
  See application file for complete search history.

(56) References Cited

FOREIGN PATENT DOCUMENTS

EP    0999499 A2    10/2000
WO    PCT/US/02/06292    2/2002

OTHER PUBLICATIONS

Wu et al., "An Efficient Software-Hardware Collaborative Profiling Technique for Wide-Issue Processors", Workshop on Binary Translation with PACT99, Newport Beach, California, pp.: 1-9, Oct. 1999.*

Conte et al., "Using Branch Handling Hardware to Support Profile-Driven Optimization", ACM, pp.: 12-21, 1994.*

Duesterwald et al., "Software Profiling for Hot Path Prediction: Less is More", ACM, pp. 202-211, Nov. 2000.*

Merten C. Matthew, et al., "A Hawardware-Driven Profiling Scheme for Indentifying Program Hot Spots to Support Runtime Optimization", May 1999, pp. 134-147, 26th Annual Intl. Symposium on Computer Architecture, Urbana, IL.

Ball, Thomas, et al., "Optimally Profiling and Tracing Programs", ACM Transactions on Programming Languages and Systems, Jul. 1994, pp. 1319-1360.

Ammons, Glenn, et al. "Exploiting Hardware Performance Counters with Flow and Context Sensitive Profiling", Written Opinion, Date of Mailing May 13, 2003.

Ball, Thomas, et al., "Edge Profiling Versus Path Profiling: The Showdown", Bell Laboratories, Lucent Technologies, {tball,mataga} @research.bell-labs.com, Dept. of Computer Science, Tel-Aviv University, sagiv@math.tau.ac.il, 25th ACM SIGPLAN-SIGACT Symposium on Principles of Programming Languages, Jan. 1998, San Diego, CA., pp 15.

(Continued)

Primary Examiner—Ted T. Vo
(74) Attorney, Agent, or Firm—Blakely, Sokoloff, Taylor & Zafman LLP (57) ABSTRACT

A method and system for collaborative profiling for continuous detection of profile phase transitions is disclosed. In one embodiment, the method, comprises using hardware and software to perform continuous edge profiling on a program; detecting profile phase transitions continuously; and optimizing the program based upon the profile phase transitions and edge profile.

29 Claims, 6 Drawing Sheets

OTHER PUBLICATIONS

Robert G. Burger & R. Kent Dybvig, "An Infrastructure for Profile-Driven Dynamic Recompilation", Proceedings of the 1998 International Conference on Computer Languages, May 14-16, 1998, pp. 240-249, IEEE Computer Society, USA.

Xiaolan Zhang et al., "System Support for Automatic Profiling and Optimization", Operating Systems Review (SIGOPS), Dec. 1, 1997, pp. 15-26, vol. 31, No. 5, ACM Headquarter, New York, USA.

PCT International Search, International App. No.: PCT/US02/06292, Applicant Ref. No.: P10788PCT, Date Completed: Oct. 10, 2002, Date Mailed: Oct. 29, 2002, pp. 1-5.

* cited by examiner

METHOD AND SYSTEM FOR COLLABORATIVE PROFILING FOR CONTINUOUS DETECTION OF PROFILE PHASE TRANSITIONS

FIELD OF THE INVENTION

This invention relates to computer software compilation and execution systems, and more specifically to a compiler that performs collaborative profiling for continuous program optimization on computer processors.

BACKGROUND OF THE INVENTION

Determining the more frequently executed portions of a program is often done through a process known as profiling. Profile-guided optimization is a compiler technique that, based on the profile feedback, selects a portion of a program as important, and optimizes that hot portion of the program aggressively, possibly at the expense of the less important, or cold, portion of the program.

Three types of profiling are generally used, heuristic, static and dynamic. A heuristic profiling technique profiles a program without ever executing the program. A prime example of heuristic techniques is described by Thomas Ball and James Larus in a paper entitled "Branch Prediction for Free," PLDI 1993. Ball and Larus provide an all software approach. In their paper, Ball and Larus describe a number of heuristics they may apply to branches in a program's code to predict whether the branch will be taken. These heuristics include, for example, a prediction (yes or no) that a comparison of a pointer against a null in an If statement will fail. Based on these binary branch predictions, a compiler can estimate what portions of the program are most likely to be executed. A drawback of heuristic profiling technique is its inaccuracy in predicting program behavior.

The static profile used by profile-guided optimization is often obtained from running the program once with a given set of input. One serious problem with profile-guided optimization using static profile is that when the program later runs with a different input set, the profile may have been altered. Furthermore, a program may have phase behavior and the static profile only captures the average behavior. As a result, the optimization benefit from the static profile may diminish.

Dynamic profiling technique collects the program profiles continuously as the program is executed. Dynamic profiling technique may be implemented in all hardware or all software. A problem with software only approaches is that the inserted profiling instructions compete with the user program for machine resources (e.g. the architectural registers) and they impose dependence that may lengthen the critical paths in the user program.

All hardware approaches for identifying the set of hot branches suffer as well. For example, the method used by Merten et al. [Matthew C. Merten, Andrew R. Trick, Christopher N. George, John C. Gyllenhaal, and Wen-mei W. Hwu, "A Hardware-Driven Profiling Scheme for Identifying Program Hot Spots to Support Runtime Optimization," Proceedings of the 26th International Symposium on Computer Architecture, May 1999] cannot detect program phase transition and may repeatedly discover the same hot regions. Furthermore, the profiles collected by using this technique are not complete and many edges in a hot region may be missed due to cache conflict and the lack of backup storage.

Sampling based profiling technique proposed by Zhang et al. [Xiaolan Zhang, Zheng Wang, Nicholas Gloy, J. Bradley Chen, and Michael D. Smith. "System Support for Automated Profiling and Optimization," 16th ACM Symposium on Operating System Principles, Oct. 5–8, 1997] may also be used to collect dynamic profile. This technique interrupts user program at sample intervals (e.g. every 100K instructions) and dumps the current program counter to a buffer. This technique requires operating system support, and the dumped information needs post-processing to determine the relative weights of the basic blocks. Furthermore, this technique cannot automatically detect program phase transition.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

A method and system for collaborative profiling for continuous detection of profile phase transitions are disclosed. The present techniques describe a continuous profiling method that improves static profiling by using software support at compile-time and hardware support at run-time. By having hardware continuously feed back profile information at run-time, the compiler can dynamically re-compile the program based on a projected benefit via profile-guided optimization.

One may formulate the continuous profile-guided optimization problem as follows. Let the profile used by the compiler be P, the hot portion of the program selected with the profile be H(P), or simply H, and the cold portion be C(P), or C. After applying optimizations on the selected H and C, one may evaluate the benefit B of the optimizations. The benefit is a function of the optimizations as well as H, C, and P, but for simplicity, the optimizations from the benefit function may be omitted. Thus, the benefit function is denoted as B (H, C, P). The continuous profile-guided optimization is a run-time profile-guided optimization based on a sequence of profile phases $P_i$ and the selection of $H_i=H(P_i)$ and $C_i=C(P_i)$. The consecutive selections must satisfy the following conditions.

1. $C_i \cap H_{i+1} \ne 0$. In other words, when a portion of the cold code ($C_i$) sacrificed during an early optimization becomes hot ($H_{i+1}$), the code is re-optimized and that portion of code is considered important.
2. $B(H_i, C_i, P_{i+1}) < B(H_{i+1}, C_{i+1}, P_{i+1})$. In other words, the profile has changed such that the optimization based on the old profile is not as beneficial as re-applying the optimization with the new profile.

As an example, code placement optimization that is often used to reduce the instruction cache and Translation Lookahead Buffer (TLB) misses. The profile used in the optimization is the branch frequency profile. For a block with a conditional branch, it selects the successor block with the higher branch probability as the fall-through target and the other less likely successor as the jump target. In this case, the highly taken branches are treated as hot ($H_i$) and the other branches ($C_i$) are sacrificed. The optimization benefit B can be measured by the total fall-through frequency. When the profile changes, e.g., when a jump edge becomes more frequently taken than the corresponding fall through edge, the blocks are reordered. Changing the jump edge to a fall through edge will increase the total fall through frequency. In other words, the edge has changed from belonging to $C_i$ under the old profile $P_i$ to belonging to $H_{i+1}$ under the new profile $P_{i+1}$. Clearly, $C_i \cap H_{i+1}$ !=0 and $B(H_i, C_i, P_{i+1}) < B(H_{i+1}, C_{i+1}, P_{i+1})$.

The set $C_i \cap H_{i+1}$ is monitored to identify profile phase transition and trigger the dynamic re-optimizer. The condition "triggering condition" occurs when the size of $C_i \cap H_{i+1}$ is larger than a threshold value, thus the program has transitioned from one profile phase to a new profile phase.

Also described is a method to easily detect when to reoptimize based upon the condition $C_i \cap H_{i+1} >=$ Threshold. To illustrate the method, edge frequency profile is used since many optimizations can benefit from knowing the set of frequently executed branches.

In the following description, for purposes of explanation, specific nomenclature is set forth to provide a thorough understanding of the present invention. However, it will be apparent to one skilled in the art that these specific details are not required in order to practice the present invention.

Some portions of the detailed descriptions, which follow, are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

An Exemplary Computer Architecture

Figure 1:
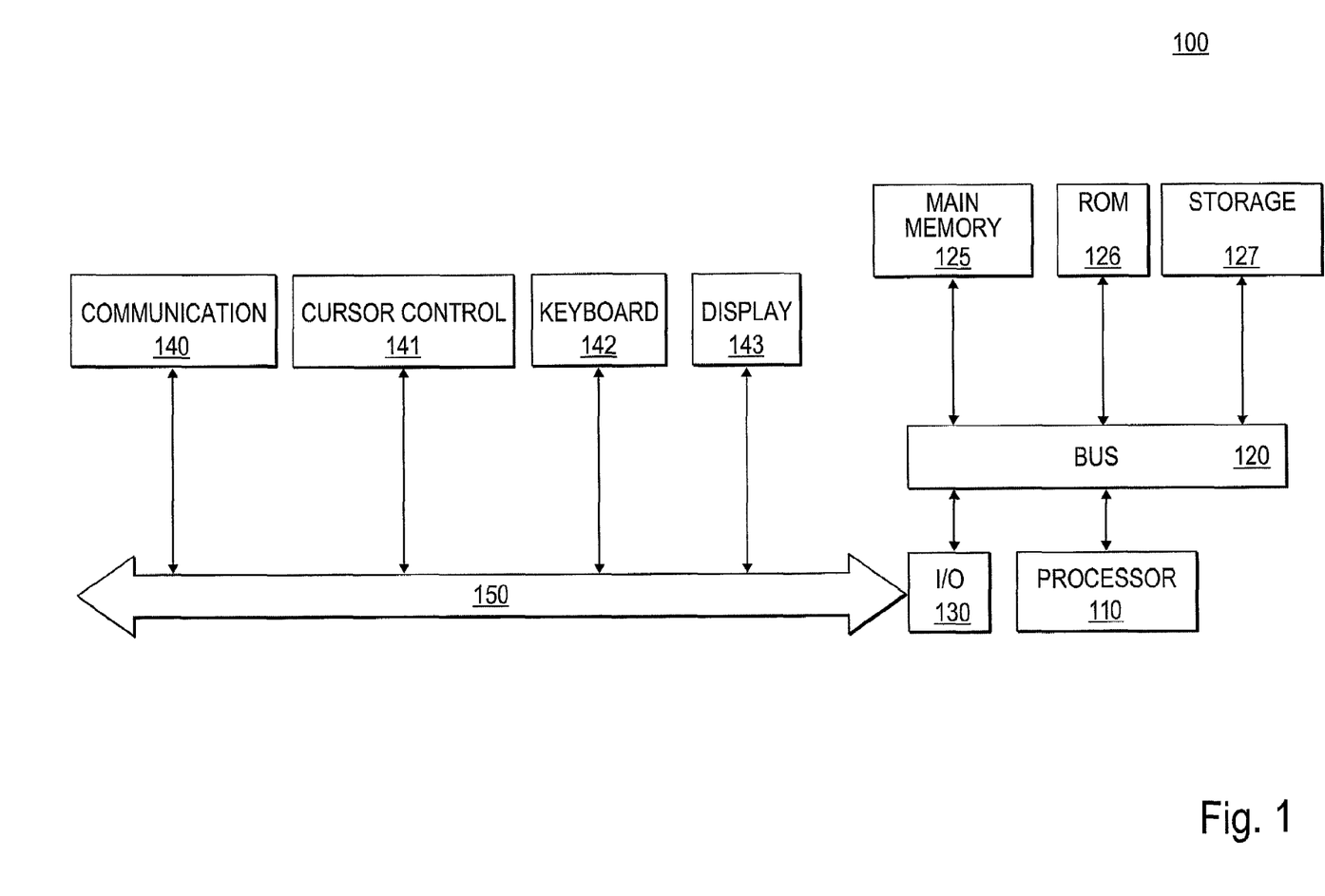
FIG. 1 illustrates a computer system representing an integrated multi-processor, in which elements of the present invention may be implemented.

FIG. 1 illustrates a computer system 100 representing an integrated multi-processor, in which elements of the present invention may be implemented. One embodiment of computer system 100 comprises a system bus 120 for communicating information, and a processor 110 coupled to bus 120 for processing information. Computer system 100 further comprises a random access memory (RAM) or other dynamic storage device 125 (referred to herein as main memory), coupled to bus 120 for storing information and instructions to be executed by processor 110. Main memory 125 also may be used for storing temporary variables or other intermediate information during execution of instructions by processor 110. Computer system 100 also may include a read for storing static information and instructions used by processor 110.

A data storage device 127 such as a magnetic disk or optical disc and its corresponding drive may also be coupled to computer system 100 for storing information and instructions. Computer system 100 can also be coupled to a second I/O bus 150 via an I/O interface 130. A plurality of I/O devices may be coupled to I/O bus 150, including a display device 143, an input device (e.g., an alphanumeric input device 142 and/or a cursor control device 141). For example, video news clips and related information may be presented to the user on the display device 143.

The communication device 140 is for accessing other computers (servers or clients) via a network. The communication device 140 may comprise a modem, a network interface card, or other well-known interface device, such as those used for coupling to Ethernet, token ring, or other types of networks.

Collaborative Profiling and Phase Transition Detection

A low overhead collaborative profiling technique for collecting edge frequency profiles continuously is disclosed. To collect edge frequency profile, the prior art profiling technique insert a load, an increment, and a store into each edge that needs profiling. In the present profiling technique, the compiler passes profiling requests as a few bits in branch instructions to the hardware, and the hardware executes the profiling operations with minimum impact on user program execution.

The efficient and continuous collection of profile and detection of phase transition require close collaboration of the software and the hardware.

Figure 2:
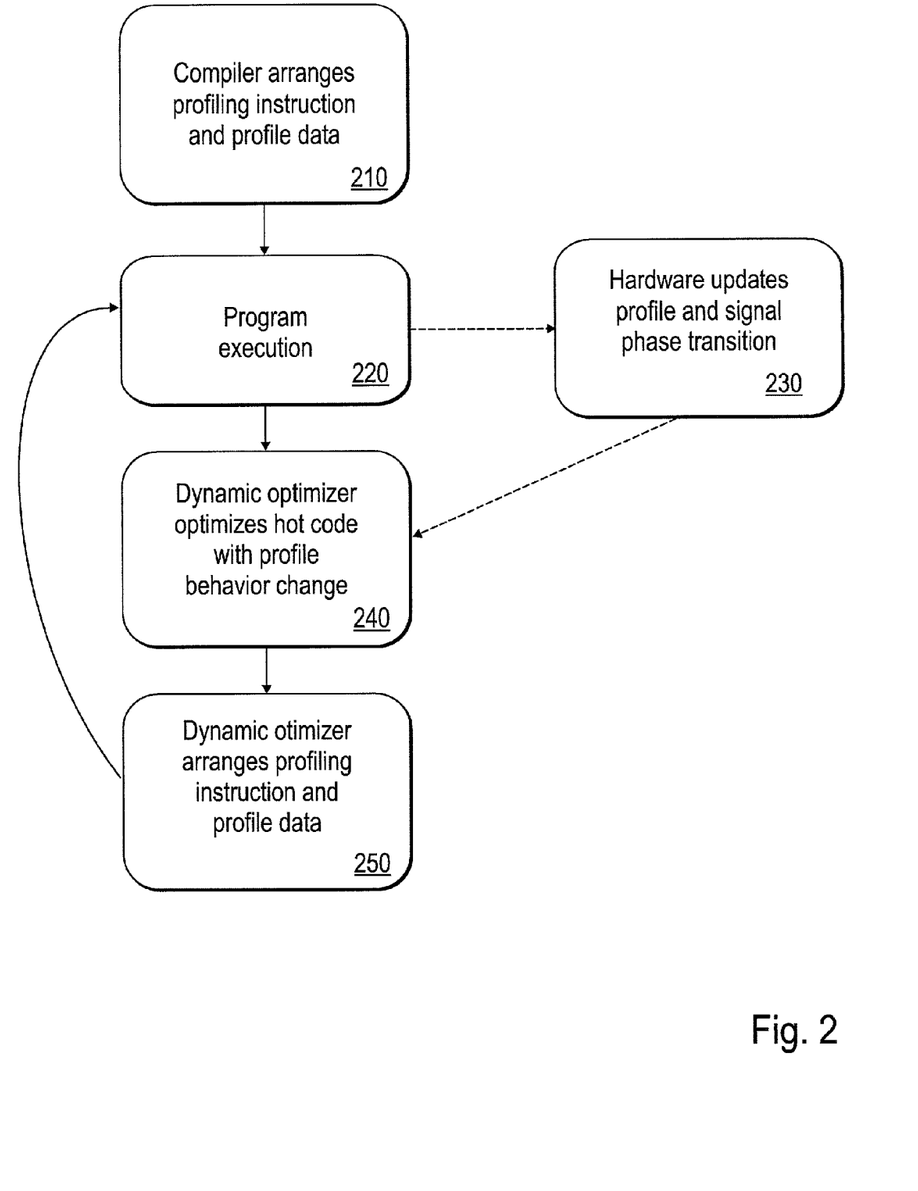
FIG. 2 illustrates a functional flow diagram showing the interaction between the software and the hardware.

FIG. 2 illustrates a functional flow diagram showing the interaction between the software and the hardware. The software (compiler and the dynamic optimizer) arranges the profile instructions and profile data in such a way such that simple hardware (processor) is sufficient to collect profile and signal profile phase transition. At block 210, the compiler software inserts or modifies profiling instructions into the program and arranges the profile data. Flow continues to block 220 where the program is executed. During the program execution, hardware updates profile and signal phase transition, then passing data back to the software.

At block 240, the dynamic optimizer optimizes the "hot" code with the profile information from the hardware. At block 250, the dynamic optimizer arranges profiling instructions into the profile data.

Flow returns back to block 220, where the program is executed again.

The present profiling techniques enable programs with profiling to run nearly as fast as without profiling. For example, less than a 0.6% increase in static cycle count was observed for collecting block frequency profile. This allows the optimized program to have profiling code inserted all the time and enable continuous profile-guided optimizations.

Figure 3:
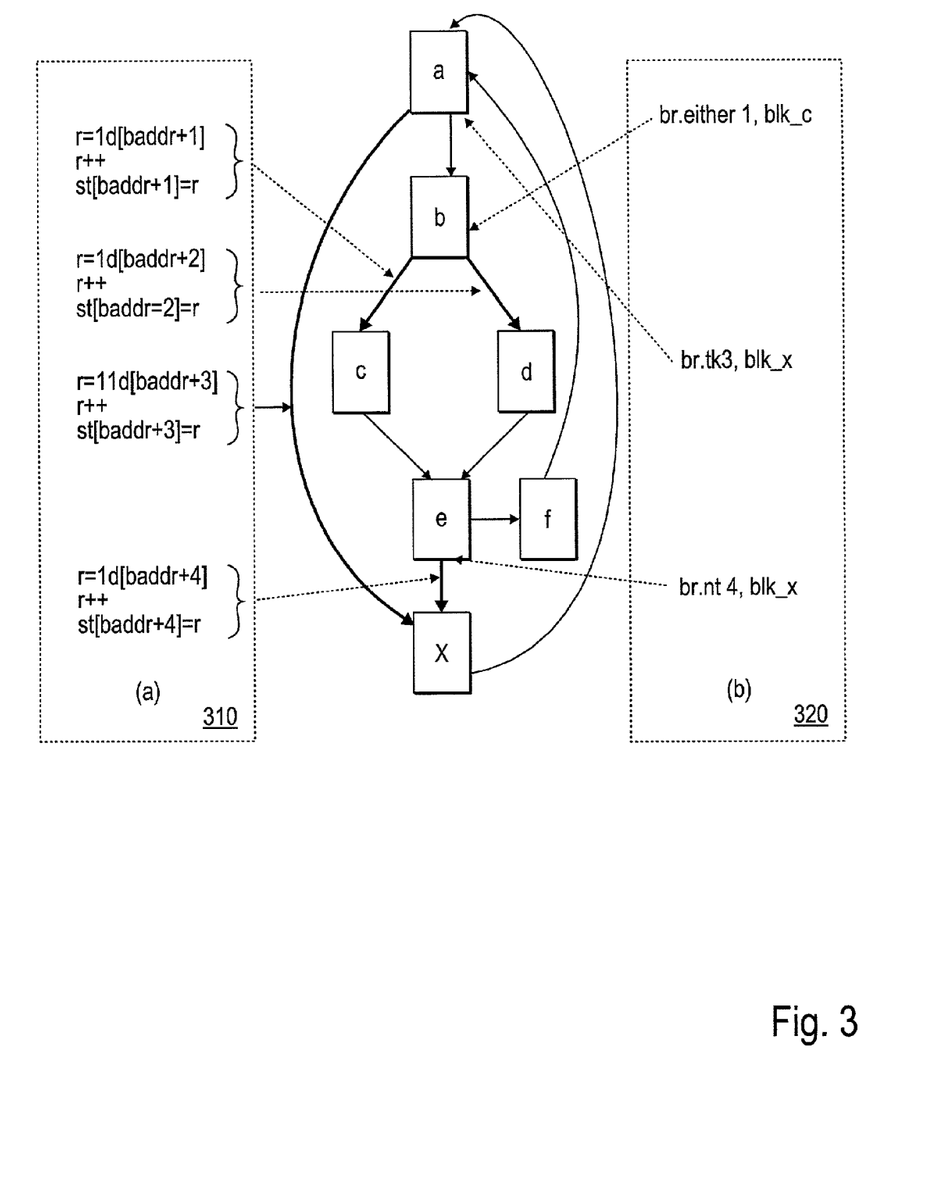
FIG. 3 illustrates a control flow graph (CFG) to describe the present collaborative profiling technique.

FIG. 3 illustrates a control flow graph (CFG) to describe the present collaborative profiling technique. In this CFG, only the edges a→x, b→c, b→d, and e→x, are profiled and the frequencies for other edges can be derived from those profiled edges. Prior art profiling techniques would insert three instructions in each of the profiled edges to load a counter from memory, increment the counter, and store the counter back to memory. The inserted profiling code is listed in box 310. The present technique modifies three branch instructions as shown in box 320. The processor derives the profile operations from the modified branch instructions and executes them without impacting the execution of the user program. In the following description, an edge selected for profiling is called a profiled edge, which is further classified as a branch edge or a non-branch edge depending on whether its source block contains a branch instruction.

The present collaborative profiling technique is described in the following steps.

1). Assign Profile ID

Profile ID's are assigned to the profiled edges for a user function. The ID's range from 1 up to the number of profiled edges. Furthermore, if two profiled edges have the same source block, they may be assigned two consecutive IDs with the smaller ID for the "taken" edge. For the example in FIG. 3, edge b→c and b→d have the same source block ("b") so we number the taken edge b→c as edge #1 and the fall through edge b→d as edge #2.

2). Allocate Profile Counter Area

For a function with N profiled edges, N counter space is allocated to store the profile for the N profiled edges. The counters are numbered 0, 1 . . . N-1, and the edge with profile ID "i" will store profile data in counter i-1.

3). Encode Profile ID

Each branch instruction has a K-bit field for storing the profile ID. The ID field stores the profile ID when one of its successor edges is profiled. If both edges of the branch are profiled, the ID field stores the ID for the taken edge. The branch instruction also has an edge selection field. The edge selection field may have a value tk, nt, either, or all, indicating the profiling of a taken edge, a not-taken edge, either edges (for two-way branches), or all edges (for indirect branches). At runtime, the hardware checks the result of the branch against its edge selection field, and if they match, the profile gets updated accordingly. Examples of the modified branch instructions are shown in box 320 where we assume that edge a→x is a taken edge and e→x is a fall-through edge (executed when the branch is not taken).

If the source block of a profiled edge does not have a branch instruction, an explicit prof_id.tk ID instruction is inserted in the source block. The prof_id instruction can carry the same information as a branch instruction, although prof_id may have more bits to store a profile ID.

The term profiling instructions is used to refer to the instructions inserted or modified by the compiler for passing profiling needs to the hardware. They include the modified branch instruction, the prof_id instruction, as well as, the initprof and setoffset instructions, that are described below. The hardware will translate the information carried by profiling instructions into profile update operations to collect profile.

4). Graph Partitioning for limited ID Field

A branch instruction may only allow a few bits for storing a profile ID. The maximum value of an ID (the number of profiled edges in a function) may be more than that the ID field can represent. An algorithm is applied to partition a CFG into regions such that the ID field can adequately represent the total number of ID's in each region. A setoffset instruction is used in the region entry block to pass an offset to the hardware, and only encode an ID relative to the offset in a branch instruction. The hardware derives profile counter addresses from the offset and the relative ID's. A graph-partitioning algorithm as described in "An Efficient Software-Hardware Collaborative Profiling Technique for Wide-Issue Processois" Workshop on Binary Translation, Newport Beach, Calif., October 1999, by Youfeng Wu et al, may be used.

The partitioning algorithm must assure that if one of the two profiled edges with the same source block is in a region, it must include the other edge in the region.

5). Indirect Branches

An indirect branch normally has more than two outgoing edges. A fixed number of bits may not be used in the branch instruction to select the profiled edges. Furthermore, when a branch executes, the hardware may not determine which edge is taken among many outgoing edges. However, in C programs, indirect edges are most often associated with switch statements. In such a scenario, we can derive edge frequency from the frequencies of the switch block to the case blocks. Thus, we use the "all" hints in the profiling instructions to collect the frequency for the blocks containing indirect branches and the blocks targeted by the indirect branches.

6). Architectural Support

In one embodiment, the processor has an 80-bit status register dedicated for profiling, called the profile information register (pir). This register contains the following fields with their respective widths in bits:

| base_address 40 | offset 24 | trigger_counter 15 | flag 1 |
|---|---|---|---|

The value base_address is the beginning address of the profile counter area for a user function. The offset is a value to be added into the relative profile ID. The trigger_counter invokes an interrupt after the number of overflowed profile counters has reached the trigger_counter threshold. The flag field indicates whether the profiling hardware is active. All fields in the pir register are preserved on function calls.

The following table summarizes the architecture supports for the new profiling technique.

| Instructions | Descriptions |
|---|---|
| br.bhint.ihint ID | Branch instruction carrying the profile ID to the hardware. The bhint can be either "tk", "nt", "either", or "all" for selecting the taken, not-taken, either edges, or all edges for profiling. The ihint can be either "inc" or "dec" for incrementing or decrementing the profile counter. |
| prof_id. bhint.ihint ID | Pass the profile ID to the hardware. The hint fields have the same meanings as in the branch instruction. |
| initprof base_addr | Initialize the pir.base_address field in pir as base_addr. |
| Setoffset offset | Set pir.offset as offset. |
| Startprof | Set pir.flag as 1 to activate or resume profiling. |
| Stopprof | Reset pir.flag as 0 to disable profiling. |
| trigger cnt | Set pir.trigger_count as cnt |

Each profiled function executes the initprof base_addr instruction before any profiling instruction in the function is executed. This initialization instruction is used to set the base address of pir (base_addr) and offset fields to zero. The startprof instruction is executed in the main function of a program to activate profiling by setting pir flag to 1. The dynamic optimizer can execute the stopprof and startprof instructions to disable and enable profiling. The trigger cnt instruction initiates trigger_counter in pir to cnt. By default, the value of the ID field in a branch or prof_id instruction is zero. Any non-zero ID is used for a profiled edge.

7). Profiling Hardware

To minimize the impact of the update operations on user program execution, dedicated hardware is used to perform the operations. The hardware intercepts prof_id and branch instructions and generates operations to update profile counters.

The hardware generates profile update operations according to the profile ID, the edge selection field, and pir. The profile counter address is calculated from the base_address, offset, and the profile ID. For a branch.either.inc ID instruction, the hardware generates the profile update operation ++(*(pir.base_address+pir.offset+ID−1)) if the branch is taken or the operation ++(*(pir.base_address+pir.offset+ID)) if the branch is not taken. For a branch.tk.inc ID instruction, the hardware only generates the profile update operation ++(*(pir.base_address+pir.offset+ID−1)) when the branch is taken. Likewise for a branch.nt.inc ID instruction, the hardware only generates the profile update operation ++(*(pir.base_address+pir.offset +ID−1)) when the branch is not taken. Similar profile update operations are generated when the branch or prof_id instructions carry the dec hints (except the ++ operation becomes the −− operation).

Figure 4:
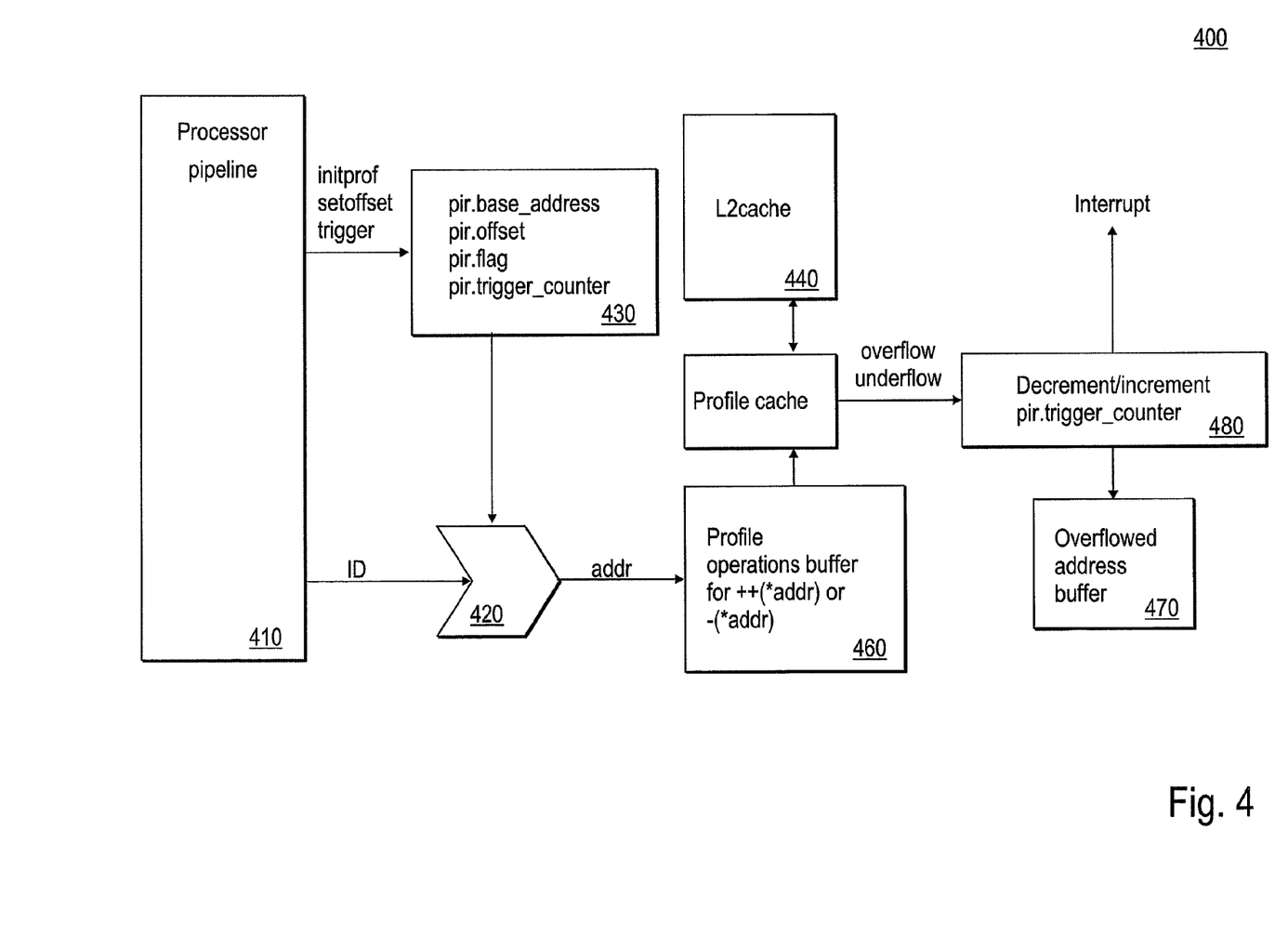
FIG. 4 illustrates an exemplary functional block diagram of profiling hardware.

FIG. 4 illustrates an exemplary functional block diagram of profiling hardware. Profiling hardware 400 includes a processor pipeline 410 to execute programs and pass on the profiling information carried by the profiling instructions. The profile counter address is calculated at block 420 from the base-address, and offset from pir 430, as well as, the profile ID from processor pipeline 410. pir 430 stores values for the base address, offset, flag, and trigger counter. The profile update operations are sent to the profile operation buffer 460 and performed on the profile cache 450. The profile hardware 400 performs the update directly without bringing data to the processor and then writing it back. Depending on the speed of the profile cache 450, it can be backed up by either L2 cache 440 or the main memory 125. The profiling hardware 450 also monitors the updated values. When a value overflows, the trigger_counter in the profiling register 430 is decremented at block 480. When value underflows, the trigger_counter in the profiling register is incremented at block 480, as well. When the trigger_counter value reaches zero, an interrupt will be generated. The addresses of the recently overflowed profile counter addresses are also kept in an overflowed address buffer 470. The dynamic optimizer may focus its optimizations based on the information obtained from the buffer 470.

Continuous Detection of Profile Phase Transitions

The profiling hardware 400 signals a profile phase transition by generating an interrupt when the pir.trigger_counter reaches zero. Here a few schemes are presented in which the interrupt is generated only if the condition $C_i \cap H_{i+1}$>=trigger_counter is satisfied. Each scheme defines $H_i$ and $C_i$ slightly differently. In the following, for an edge e, counter(e) is the profile counter value collected by the profiling hardware, and profile(e) is the edge frequency derived by the dynamic optimizer from counter(e). Counter (e) may be different from profile (e) if the initial value for counter(e) is not zero.

Figure 5A:
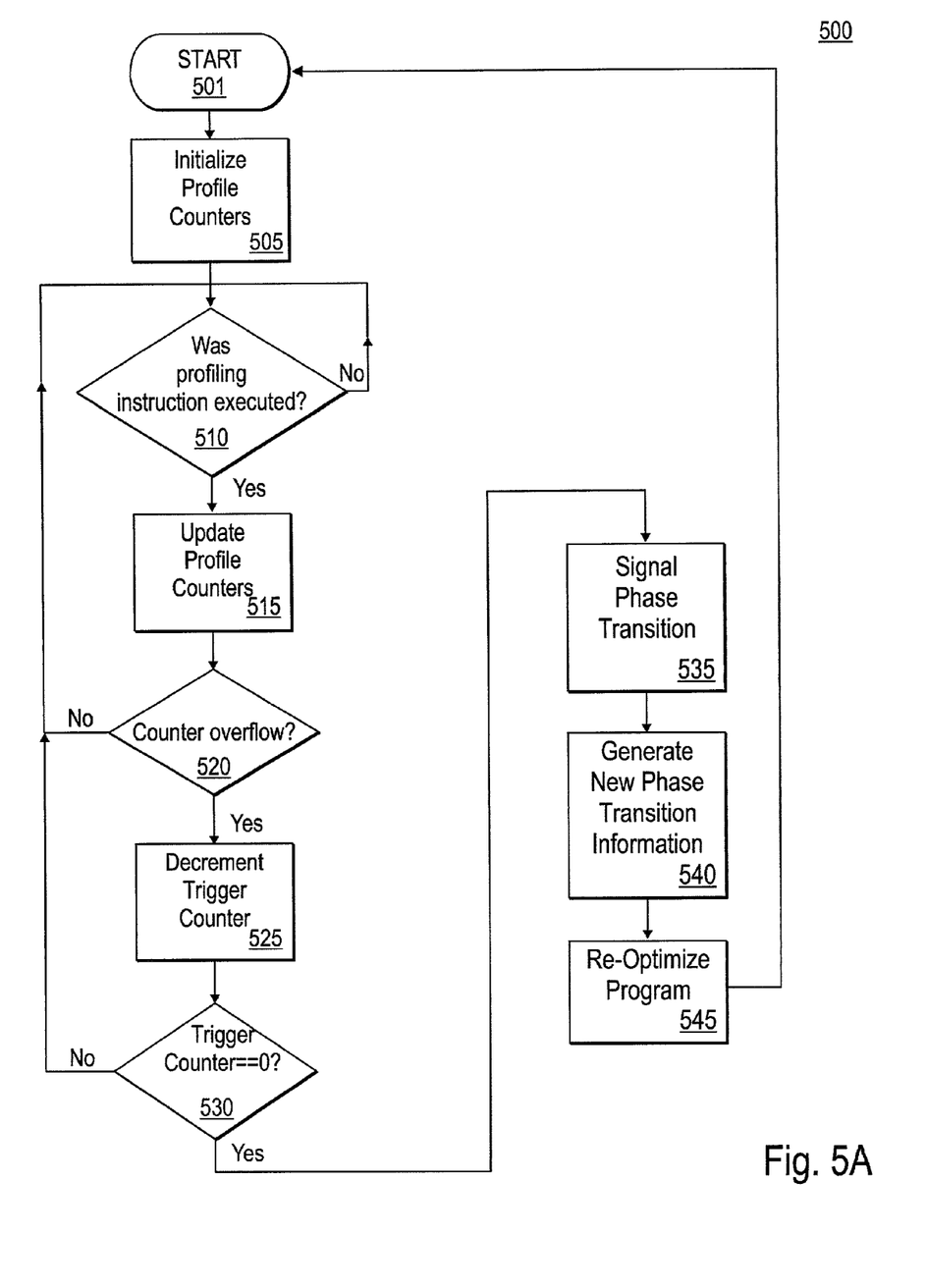
FIG. 5A illustrates one embodiment of an exemplary flow chart for the continuous detection of profile phase transitions.

FIG. 5A illustrates one embodiment of an exemplary flow chart for the continuous detection of profile phase transitions. Process 500 begins at block 501. Flow continues to block 505 where the edge counters are initialized. Assume the current phase of profile-guided optimization selected $H_i$ and $C_i$. After the optimization, counter (e) for an edge e∈$H_i$ will be initialized to 0 and counter(e) for an edge e∈$C_i$ will be initialized to MAX_VALUE−HOT_THRESHOLD (scope), where scope can be an edge or a region or a function that contains the profiled edge, and HOT_THRESHOLD (scope) is a threshold value specific to the scope. The pir.trigger_counter is initialized to a proper value.

Counter(e) is large enough to store the value MAX_VALUE. We require that MAX_VALUE>2*max_count, where max_count is the maximum possible execution frequency of any edge during a profiling period. In particular, max_count>HOT_THRESHOLD (scope).

Flow continues to decision block 510. If a profiling instruction is executed, flow continues to processing block 515. If the profiling instruction is not executed, flow loops back to decision block 510, until a profiling instruction is executed. Once a profiling instruction is executed, the profile counters are updated at processing block 515.

At decision block 520, hardware 400 determines if the counter overflows. If there is no overflow, flow continues back to block 510. If there is overflow, then flow continues to block 525.

If counter(e) overflows, we know the following two conditions are true:

1. The edge e has been executed at least HOT_THRESHOLD (scope) times.
2. The edge e must be in $C_i$. Notice that for an edge in $H_i$ to overflow its profile counter, it must have executed MAX_VALUE times. This is impossible as MAX_VALUE>2*max_count.

In other words, when counter(e) overflows, the edge e that is identified as cold in the previous profile phase becomes hot in the current phase. At that time, the trigger_counter is decremented at processing block 525. Flow continues to decision block 530, where if trigger_counter reaches zero, an interrupt is generated at processing block 535 which signals a phase transition. Flow continues to processing block 540 where new phase transition information is generated. At processing block 545, the dynamic optimizer may take over and use the new edge profile information to re-optimize the program. Flow then returns to start block 501.

The dynamic optimizer identifies the new hot edges as follows:

$$H_{i+1}=\{e | e \in H_i \,\&\&\, \text{counter}(e)>\text{HOT\_THRESHOLD (scope) or } e \in C_i \,\&\&\, \text{counter}(e) \text{ overflows}\}$$

The set of hot edges ($H_{i+1}$) identified this way satisfies the condition $|C_i \cap H_{i+1}|$==cnt>0, where cnt is the initial value in pir.trigger_counter set by the trigger cnt instruction. The dynamic optimizer can also compute the profile values from the counter values as follows:

$$\text{profile}(e) = \begin{cases} \text{counter}(e), & \text{if } e \in H_i \\ \text{HOT\_THRESHOLD(scope)} + \text{counter}(e), & \text{if } e \in C_1 \end{cases}$$

One caveat with the above scheme is that, if the profile runs long enough, the frequency of a cold edge may have exceeded the threshold, but it is still much less frequent than the hot edge. This condition is a false transition signal (FTS). This can happen because an absolute value HOT_THRESHOLD(scope) to pick up a hot edge.

In one embodiment the dynamic optimizer checks the profile and skips the optimization when it detects that many of the overflowed edges indicate a False Transition Signal (FTS). This is a practical method, as an FTS may occur only when the program has run for a very long time. As a result, the overhead of an interrupt and invocation of the dynamic optimizer become insignificant.

Figure 5B:
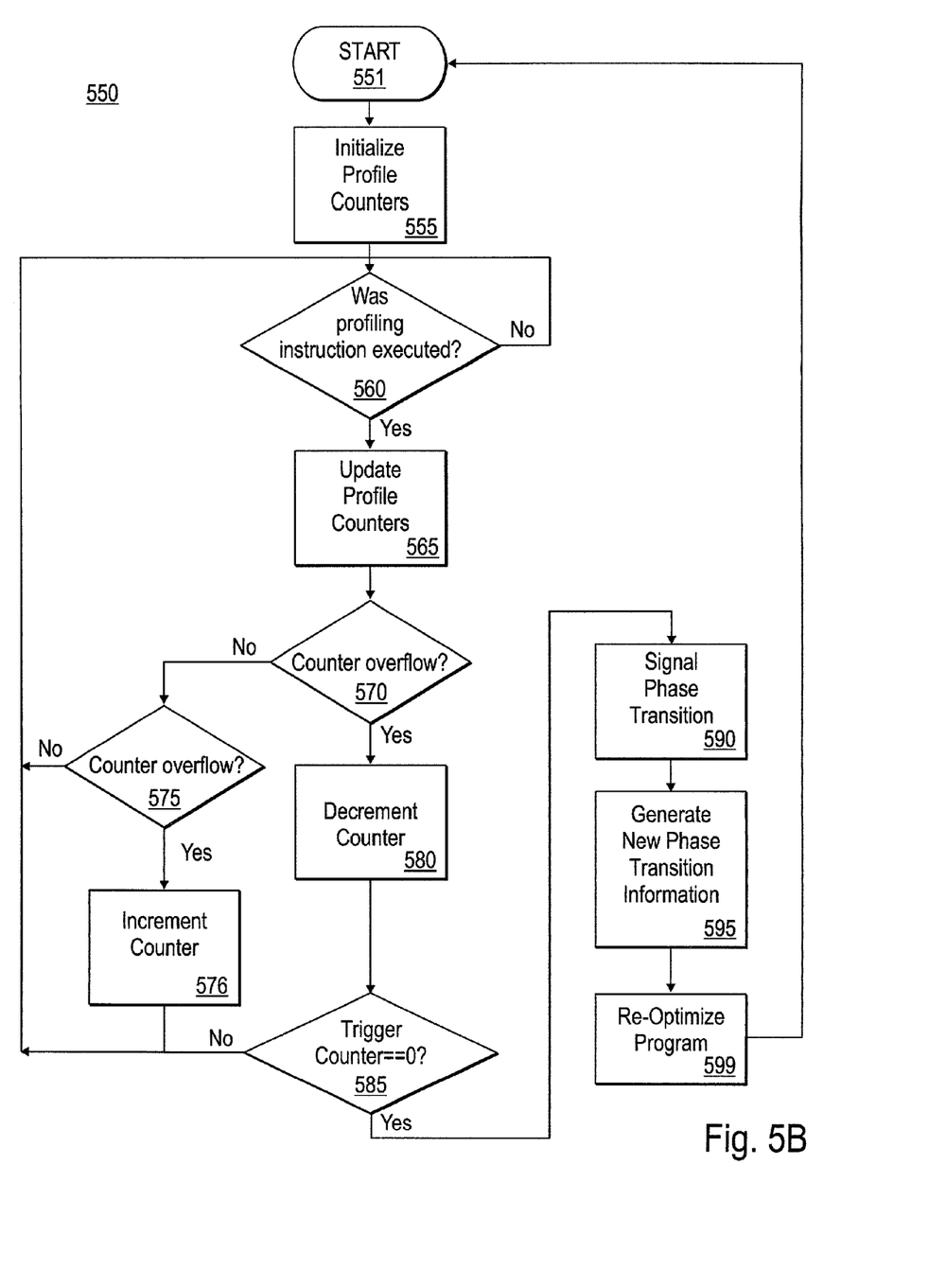
FIG. 5B illustrates another embodiment of an exemplary flow chart for the continuous detection of profile phase transitions.

FIG. 5B illustrates another embodiment of an exemplary flow chart for the continuous detection of profile phase transitions. In this embodiment, a one-to-one mapping may be used between the edges in $H_i$ and $C_i$. For the block ordering optimization, this mapping may be easily created, as the fall-through edge may be mapped with the corresponding jump edge. Assume the mapping is M(c)=h and c=$M^{-1}$(h), for c∈$C_i$ and h∈$H_i$.

Process 550 begins at block 551. Flow continues to block 555 where the edge (profile) counters are initialized. Assume the current phase of profile-guided optimization selected $H_i$ and $C_i$. After the optimization, counter (e) for an edge e∈$H_i$ will be initialized to 0 and counter(e) for an edge e∈$C_i$ will be initialized to MAX_VALUE−DIFF_THRESHOLD (scope). The pir.trigger_counter is initialized to a proper value.

Counter(e) is large enough to store the value MAX_VALUE>2*max_count, where max_count is the maximum possible execution frequency of any edge during a profiling period. In particular, max_count>DIFF_THRESHOLD (scope).

Flow continues to decision block 560. If a profiling instruction is executed, flow continues to processing block 565. If the profiling instruction is not executed, flow loops back to decision block 560, until a profiling instruction is executed. Once a profiling instruction is executed, the profile counters are updated at processing block 565.

At decision block 570, hardware 400 determines if the counter overflows. If there is no overflow, flow continues to decision block 575. The profiling scheme is enhanced to avoid FTS by monitoring the difference between the cold edge and the corresponding hot edge. For an edge c∈C, to become hot, profile(c)−profile (h)>DIFF_THRESHOLD(c). In order to monitor the difference, counter(c) is initialized to be MAX_VALUE−DIFF_THRESHOLD(c). The dec hint in the profile instruction is used for edge h to decrement counter(c) and the inc hint in the profile instruction for c is used to increment counter(c). When counter(c) overflows, $$\text{counter}(c)=\text{MAX\_VALUE}-\text{DIFF\_THRESHOLD}(c)+\text{profile}(c)-\text{profile}(h)>\text{MAX\_VALUE}.$$

Namely, $$\text{profile}(c)-\text{profile}(h)>\text{DIFF\_THRESHOLD}(c).$$

This condition indicates that the edge c, which was in $C_i$, has changed to $H_{i+1}$.

At decision block 575, hardware determines if the counter underflows. If the counter underflows, flow continues to processing block 576, otherwise flow returns to decision block 560.

At block 576, the trigger_counter is incremented. A profiling instruction is added in edge c to increment counter (h) to collect profile(c). From the above difference and profile(c), profile(h) may be determined. Notice that, the counter(c) may underflow, as the dec hint is used in the profile instruction for edge h to decrement counter(c). When counter(c) underflows, counter(c) may have previously overflowed. Otherwise counter(c) may have been decremented at least MAX_VALUE−DIFF_THRESHOLD(c) times. After incrementing trigger_counter, flow continues back to decision block 560.

If there is overflow at decision block 570, then flow continues to block 580. The trigger_counter is decremented at processing block 580. Flow continues to decision block 585, where if trigger_counter reaches zero, an interrupt is generated at processing block 590 which signals a phase transition. Flow continues to processing block 595 where new phase transition information is generated. At processing block 599, the dynamic optimizer may take over and use the new edge profile information to re-optimize the program. Flow then returns to start block 551.

The dynamic optimizer identifies the new hot edges as follows.

$$H_{i+1}=\{e | e \in H_i \,\&\&\, \text{counter}(e)>\text{HOT\_THRESHOLD (scope) or } e \in C_i \,\&\&\, \text{counter}(e) \text{ overflows}\}$$

The dynamic optimizer can also compute the profile values from the counter values as follows. For an edge c∈$C_i$ and h=M(c)∈$H_i$, profile(c)=counter(h)
profile(h)=counter(h)−counter(c)−DIFF_THRESHOLD (scope)

When the hardware interrupt is generated, cnt edges satisfy the condition profile(c)−profile(h)>DIFF_THRESHOLD(c), where cnt is the initial value in pir.trigger_counter set by the trigger cnt instruction. An edge may have temporarily satisfied the condition and, as profiling continues, it may no longer satisfy the condition. This will correspond to an overflow followed by an underflow of counter(c). The edge will not be counted as an edge contributed to the phase transition.

The present method of close collaboration between the software and the hardware is exploited. Minimal instrumentation is used in a user program and the hardware 400 generates profile update operations and executes the update operations asynchronously with user programs. Complete edge profile information may be collected with very low overhead, and the profile information collected has already been aggregated and is ready for use in optimizations. Furthermore, the collaboration between the software and the hardware provides an efficient method to detect profile phase transition. Without the software support, typical hardware may repeatedly discover the same hot spots. Without the hardware support, the detection of phase transition could be very expensive. The present method and system are capable of detecting profile transitions continuously and efficiently.

A method and system for collaborative profiling for continuous detection of profile phase transitions is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

I claim:

1. A method, comprising:
   during execution of a program, repeatedly performing edge profiling, comprising:
      detecting profile phase transitions in the program by profiling hardware;
      updating profile phase transitions by the profiling hardware in response to detected profile phase transitions;
      signaling profile phase transitions to a dynamic optimizer by the profiling hardware; and
      optimizing the program by the dynamic optimizer based upon the profile phase transitions.

2. The method of claim 1, further comprising:
   inserting edge profiling instructions by a compiler into the program;
   arranging profile data by the compiler; and
   executing the program.

3. The method of claim 2, wherein inserting edge profiling instructions comprises modifying branch instructions to assign an identifier to one or more profiled edges, and to assign a value to an edge selection field.

4. The method of claim 3, wherein inserting edge profiling instructions further comprises inserting a profile identifier instruction when the profiled edge lacks at least one of a branch instruction; an initialize profile instruction; and a set offset instruction.

5. The method of claim 2, wherein repeatedly performing edge profiling comprises translating edge profiling instructions into profile update operations by the profiling hardware.

6. The method of claim 4, further comprising:
   loading a profile information register with a base address, an offset value, a trigger-counter, and a flag.

7. The method of claim 5, further comprising:
   intercepting with the profiling hardware the profiling instructions;
   generating a profile update operation; and
   updating profile counters.

8. The method of claim 1, wherein signaling profile phase transitions comprises generating an interrupt signal by the profiling hardware when the profile phase transition occurs.

9. The method of claim 8, further comprising:
   determining if a program edge is hot, comprising
      determining if the profiling instruction is executed, and
      updating profiling counters associated with the profiling instruction;
   determining if a cold edge becomes a hot edge, comprising
      incrementing and decrementing trigger counters, and
      detecting if trigger counters overflow and underflow;
         preventing a false phase transition by detecting trigger counters underflow.

10. The method of claim 1 wherein signaling profile phase transitions to the dynamic optimizer by the profiling hardware comprises:
    not signaling a profile phase transition if a false transition signal is detected by the profiling hardware.

11. A system, comprising:
    a processor pipeline to generate a profile ID for each profiled edge, and generate profile update operations;
    a profile information register coupled to the processor pipeline;
    a first logic device to accept the profile update operations and profile ID to generate a memory buffer address;
    a profile cache to accept the buffer address connected to the first logic device; and
    a second logic device connected to the profile cache to generate a phase transition interrupt signal,
    wherein the system performs edge profiling on a program including directly measuring branch execution frequencies over an entire execution period of the program, detects profile phase transitions repeatedly, wherein a profile phase transition is an indication that one or more cold program edges have become a corresponding number of hot program edges, and optimizes the program based upon the profile phase transitions.

12. The system of claim 11, wherein the processor pipeline
    executes the program;
    intercepts profiling instructions and updates profile counters; and
    updates profile phase transition trigger counters, and signals phase transitions.

13. The system of claim 12, wherein software inserts edge profiling instructions for modifying branch instructions to assign an identifier to one or more profiled edges, and to assign a value to an edge selection field.

14. The system of claim 13, wherein the software while inserting edge profiling instructions, also inserts a profile identifier instruction when the profiled edge does not have a branch instruction; an initialize profile instruction; and a set offset instruction.

15. The system of claim 12, wherein the system translates edge profiling instructions into profile update operations.

16. The system of claim 14, wherein the processor pipeline loads a profile information register with a base address, an offset value, a trigger-counter, and a flag.

17. The system of claim 15, wherein the processor pipeline:
    intercepts the profiling instructions;
    generates a profile update operation; and
    updates profile counters.

18. The system of claim 11, wherein the second logic device generates an interrupt signal when the profile phase transition occurs.

19. The system of claim 18, wherein the system:
   determines if a program edge is hot, by determining if the profiling instruction is
      executed, updating profile counters associated with the profiling instruction, and
      determining if the trigger counters overflow;
   determines if a cold edge becomes a hot edge, comprising incrementing and decrementing trigger counters, and detecting if trigger counters overflow and underflow;
   prevents a false phase transition by detecting trigger counters underflow.

20. A computer-readable medium having stored thereon a plurality of instructions, said plurality of instructions when executed by a computer, cause said computer to perform:
   during execution of a program, repeatedly performing edge profiling, comprising:
      detecting profile phase transitions in the program by profiling hardware;
      updating profile phase transitions by the profiling hardware in response to detected profile phase transitions;
      signaling profile chase transitions to a dynamic optimizer by the profiling hardware; and
      optimizing the program by the dynamic optimizer based upon the profile phase transitions.

21. The computer-readable medium of claim 20 having stored thereon additional instructions, said additional instructions when executed by the computer cause said computer to further perform:
   inserting edge profiling instructions by a compiler into the program;
   arranging profile data by the compiler; and
   executing the program.

22. The computer-readable medium of claim 21 having stored thereon additional instructions, said additional instructions when executed by the computer to insert edge profiling instructions, cause said computer to further perform:
   modifying branch instructions to assign an identifier to one or more profiled edges, and to assign a value to an edge selection field.

23. The computer-readable medium of claim 22 having stored thereon additional instructions, said additional instructions when executed by the computer to insert edge profiling instructions, cause said computer to further perform:
   inserting a profile identifier instruction; when the profiled edge does not have a branch instruction, an initialize profile instruction, and a set offset instruction.

24. The computer-readable medium of claim 21, wherein repeatedly performing edge profiling comprises translating edge profiling instructions into profile update operations by the profiling hardware.

25. The computer-readable medium of claim 23 having stored thereon additional instructions, said additional instructions when executed by the computer, cause said computer to further perform:
   loading a profile information register with a base address, an offset value, a trigger-counter, and a flag.

26. The computer-readable medium of claim 24 having stored thereon additional instructions, said additional instructions when executed by the computer, cause said computer to further perform:
   intercepting with the profiling hardware the profiling instructions;
   generating a profile update operation; and
   updating profile counters.

27. The computer-readable medium of claim 20 wherein signaling profile phase transitions comprises generating an interrupt signal by the profiling hardware when the profile phase transition occurs.

28. The computer-readable medium of claim 27 having stored thereon additional instructions, said additional instructions when executed by the computer, cause said computer to further perform:
   determining if a program edge is hot, comprising
      determining if the profiling instruction is executed, and
      updating profile counters associated with the profiling instruction;
   determining if a cold edge becomes a hot edge, comprising
      incrementing or decrementing trigger counters, and
      detecting if trigger counters overflow and underflow;
   preventing a false phase transition by detecting trigger counters underflow.

29. The computer-readable medium of claim 20 wherein signaling profile phase transitions to the dynamic optimizer by the profiling hardware comprises:
   not signaling a profile phase transition if a false transition signal is detected by the profiling hardware.

* * * * *